US012684420B2

(12) United States Patent (10) Patent No.: US 12,684,420 B2
Chin (45) Date of Patent: Jul. 14, 2026

(54) MULTI-TRANSPORT FREQUENCY SELECTION

(71) Applicant: Hughes Network Systems, LLC, Germantown, MD (US)

(72) Inventor: Michael Chin, San Diego, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 672 days.

(21) Appl. No.: 18/161,920

(22) Filed: Jan. 31, 2023

(65) Prior Publication Data

US 2024/0259878 A1 Aug. 1, 2024

(51) Int. Cl.
  *H04W 28/18* (2009.01)
  *H04B 7/185* (2006.01)
  *H04W 28/08* (2023.01)
  *H04W 72/1273* (2023.01)

(52) U.S. Cl.
  CPC ....... *H04W 28/18* (2013.01); *H04W 28/0925* (2020.05); *H04W 72/1273* (2013.01)

(58) Field of Classification Search
  CPC ......... H04W 28/0268; H04W 28/0925; H04W 28/0942; H04W 28/18; H04W 28/20; H04W 28/22; H04W 28/24; H04W 72/1268; H04W 72/1273; H04B 7/18513; H04B 7/18517; H04B 7/18519; H04B 7/18539; H04B 7/18558; H04B 7/18563
  See application file for complete search history.

(56) References Cited

U.S. PATENT DOCUMENTS

| | | | | |
|---|---|---|---|---|
| 10,349,462 | B2 * | 7/2019 | Altman | H04L 43/20 |
| 11,342,987 | B2 * | 5/2022 | Metzger | H04B 7/18519 |
| 11,873,005 | B2 * | 1/2024 | Altman | G01C 21/3889 |
| 11,974,212 | B2 * | 4/2024 | Christopherson | H04W 48/16 |
| 2020/0112362 | A1 | 4/2020 | Roy et al. | |
| 2020/0236043 | A1 * | 7/2020 | Sze | H04L 45/302 |
| 2021/0067907 | A1 * | 3/2021 | Sze | H04N 21/422 |
| 2022/0278742 | A1 | 9/2022 | Gineste et al. | |

(Continued)

OTHER PUBLICATIONS

"Data Sheet—HT2000L Multi Path Terminal"; Aug. 2018.
International Search Report and Written Opinion mailed Mar. 13, 2024 for PCT/US2023/079470 (9 pages).

*Primary Examiner* — Moo Jeong
*Assistant Examiner* — Scott A Schlack
(74) *Attorney, Agent, or Firm* — Brooks Kushman P.C.

(57) ABSTRACT

A system and method for device management in a multipath communication system includes: receiving candidate signal metrics data from a multipath modem of the device of supported combinations satellite networks and associated satellite frequencies and cellular networks and associated cellular frequencies; receiving subscriber data including a device location; evaluating the supported combinations by filtering supported satellite networks and supported cellular networks based upon internet service policies and/or network service policies in the device location; selecting configuration parameters having a selected satellite network and satellite frequency and a selected cellular network and cellular frequency based on the evaluated supported combinations; and transmitting the selected configuration parameters to the multipath modem to control operation of the multipath modem.

19 Claims, 6 Drawing Sheets

(56) References Cited

U.S. PATENT DOCUMENTS

| | | | |
|---|---|---|---|
| 2023/0122634 A1* | 4/2023 | Uchino | H04W 8/24 |
| | | | 455/427 |
| 2023/0403576 A1* | 12/2023 | Yu | H04W 88/06 |
| 2024/0187839 A1* | 6/2024 | Whited | H04W 60/00 |

* cited by examiner

GEO

MEO

LEO

142

132

152

150

140

130

110

120

122

DEVICE MANAGEMENT SERVER 124

100

MULTI-TRANSPORT FREQUENCY SELECTION

BACKGROUND

Recently, satellite broadband service has been combined with terrestrial wireless service to provide a low-latency, multi-transport broadband service using "multipath" communication over the satellite and terrestrial wireless paths. As used herein, a physical data communication link for each of these paths will be referred to as a transport. A device with a multipath modem may include radios for communicating over both a satellite transport and a terrestrial wireless (i.e., cellular) transport or over multiple satellite transports in a multipath manner. While a multipath modem may be able to use various combinations of networks and frequencies for the multiple (i.e., at least two) transports, a set of multipath transports selected by a device may not address overall network considerations such as network planning and usage patterns.

DETAILED DESCRIPTION

Figure 1:
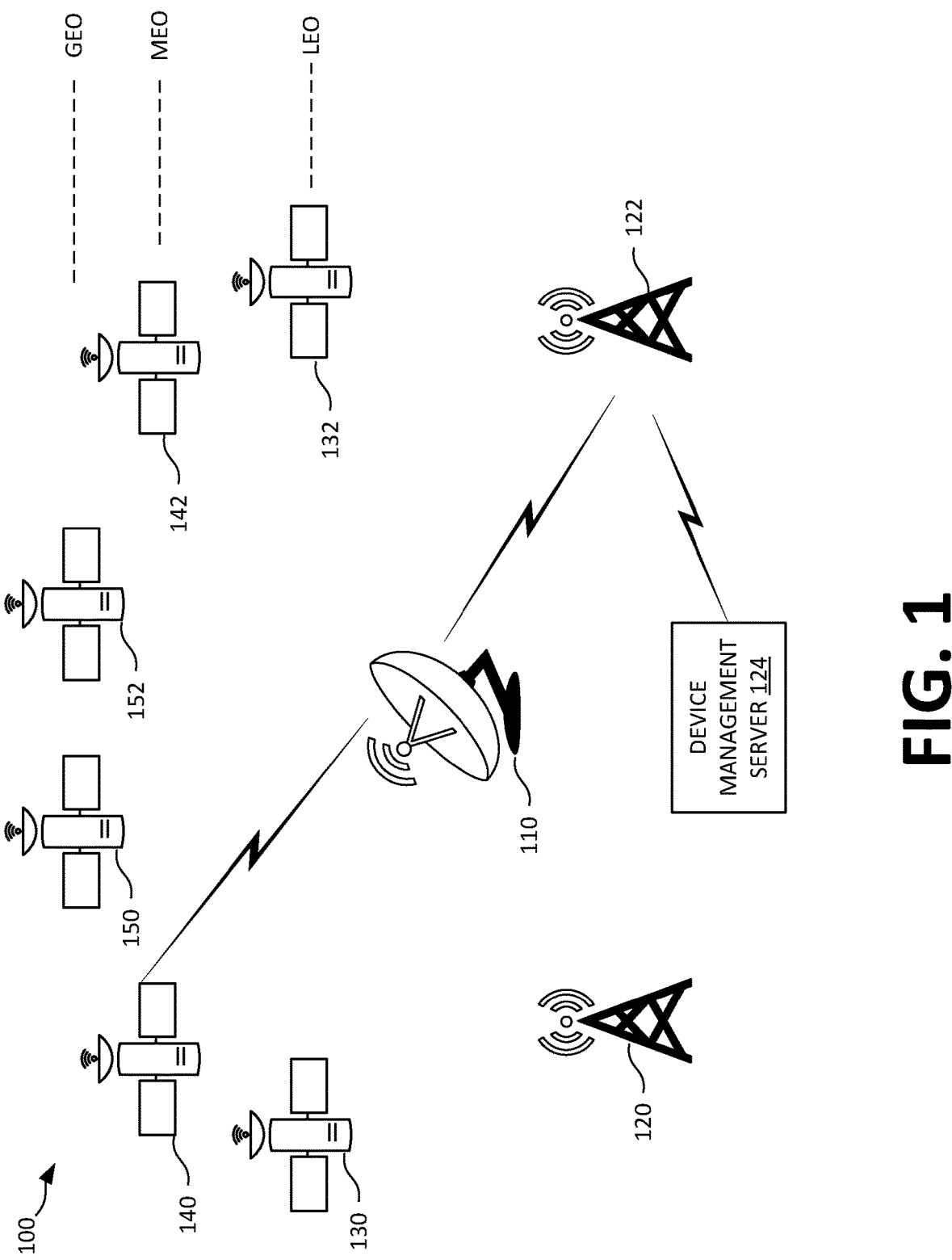
FIG. 1 is an example diagram of a multipath communication system.

With multiple radio transports (satellite and cellular) and networks available to a multipath modem, the multipath modem must be able to optimally select the serving network and operating frequency for each transport. Ensuring that the device radio connects to the optimal network is important for radio performance and operational stability. The selection of the optimal network depends in part on the available physical transport characteristics and networks for each integrated device radio. However, beyond the physical transport characteristics, optimal network selection from a network efficiency perspective also typically depends on network management policies and rules, like network planning, operator service plans, and subscriber service contracts and data usage.

Whereas non-multipath devices only have to optimize for a singular transport, the optimization challenge can grow exponentially with the number of available transports in a multipath device. The present disclosure provides a system and method to manage the selection of transport networks and frequencies through both observable characteristics, like signal metrics, and network-based characteristics, like policies and subscriber plans.

When designing wireless radio devices, radiated radio-frequency interference (RFI) is a key consideration from a device performance perspective. For devices that contain or operate multiple wireless radios such as a multipath modem, ensuring that these radios do not interfere at both the radiated signal and board level can be critical for device radio performance.

In accordance with the present disclosure, a multi-path modem can be operated on two or more networks based on selected optimal operational radio network frequencies. Techniques described here include steps to discover, analyze, and identify the optimal radio network and frequency combinations that can provide stable and reliable multipath wireless operation on at least one cellular and satellite network. The disclosed systems and methods can determine network and operational data about the observable terrestrial/satellite wireless networks like signal metrics, i.e., measurements of a radio signal such as received signal strength indicator (RSSI) and signal-to-noise ratio (SNR), connection throughput, reliability, and network preference. These gathered network data may be evaluated together with network management policies and rules to assist in determining the optimal operational networks and frequencies for the multipath modem to operate on from a perspective of connection reliability, speed, and/or latency, as well as from a perspective of network operational efficiency.

In one or more implementation of the present disclosure, a system includes a computer having a processor and a memory. The memory stores instructions executable by the processor to: receive signal metrics data from a multipath modem specifying supported combinations of satellite networks and associated satellite frequencies, and cellular networks and associated cellular frequencies for operation of the multipath modem; receive subscriber data including a device location; evaluate the supported combinations by filtering supported satellite networks and supported cellular networks based upon internet service policies and/or network service policies in the device location; select configuration parameters having a selected combination of a satellite network and satellite frequency (upload and download frequencies) and a selected cellular network and cellular frequency (upload and download frequencies) based on the evaluated supported combinations; and transmit the selected configuration parameters to the multipath modem to control operation of the multipath modem.

In another implementation, the system may further include instructions executable by the processor to: receive subscriber data including a subscriber service plan and subscriber usage data; and evaluate the supported combinations based upon ranking the supported combinations based upon network coverage area and/or available network bandwidth.

In yet another implementation, the system may further include instructions executable by the processor to evaluate the supported combinations based upon comparing data plans of the ranked supported combinations to the subscriber service plan.

In a further implementation, the system may also include instructions executable by the processor to evaluate the supported combinations by filtering the ranked supported combinations to those meeting the subscriber service plan and subscriber data usage to obtain remaining supported combinations.

In an implementation, the system may further include instructions executable by the processor to prioritize remaining supported combinations based upon at least one of a signal metric, contractual relationship, network data bandwidth, and network data balancing.

In another implementation, the selected configuration parameters may be based upon the remaining supported combinations having a highest priority.

In another implementation, the supported combinations may include non-interfering network and frequency combinations as determined by an operational scan by the multipath modem, and the selected configuration parameters are included in a selected operating profile.

In an implementation, the system may further include the multipath modem, wherein the multipath modem includes a modem processor and modem memory, the modem memory storing instructions executable by the modem processor to perform an operational scan of satellite and terrestrial wireless network combinations to determine signal strength and signal-to-noise for supported network and frequency combinations.

In another implementation, the system may further include instructions executable by the modem processor to determine non-interfering satellite and wireless network and frequency combinations as the supported combinations.

In yet another implementation, the system may further include instructions executable by the modem processor to: receive a selected operating profile with the configuration parameters from the computer; and apply the selected operating profile to the operation of radios of the multipath modem.

In one or more implementations of the present disclosure, a method may include receiving signal metrics data from a multipath modem specifying supported combinations of satellite networks and associated satellite frequencies, and cellular networks and associated cellular frequencies for operation of the multipath modem; receiving subscriber data including a device location; evaluating the supported combinations by filtering supported satellite networks and supported cellular networks based upon internet service policies and/or network service policies in the device location; selecting configuration parameters having a selected satellite network and satellite frequency and a selected cellular network and cellular frequency based on the evaluated supported combinations; and transmitting the selected configuration parameters to the multipath modem to control operation of the multipath modem.

In an implementation, the method may further include: receiving subscriber data including a subscriber service plan and subscriber usage data; and evaluating the supported combinations based upon ranking the supported combinations based upon network coverage area and/or available network bandwidth.

In another implementation, the method may further include evaluating the supported combinations based upon comparing data plans of the ranked supported combinations to the subscriber service plan.

In yet another implementation, the method may further include evaluating the supported combinations by filtering the ranked supported combinations to those meeting the subscriber service plan and subscriber data usage to obtain remaining supported combinations.

In an implementation, the method may further include prioritizing remaining supported combinations based upon at least one of a signal metric, contractual relationship, network data bandwidth, and network data balancing.

In another implementation, the selected configuration parameters may be based upon the remaining supported combinations having a highest priority.

In an implementation, the supported combinations include non-interfering network and frequency combinations as determined by an operational scan by the multipath modem, and the selected configuration parameters may be included in a selected operating profile.

In an implementation, the method may further include the multipath modem performing an operational scan of satellite and terrestrial wireless network combinations to determine signal strength and signal-to-noise for supported network and frequency combinations.

In another implementation, the method may further include the multipath modem determining non-interfering satellite and wireless network and frequency combinations as the supported combinations.

In yet another implementation, the method may further include the multipath modem: receiving a selected operating profile with the configuration parameters from the device management computer; and operating radios of the multipath modem in accordance with the selected operating profile.

With reference to FIG. 1, a diagram of an example multipath communication system 100 is illustrated. The multipath communication system 100 can provide communications between a multipath modem 110, one or more terrestrial wireless networks 120, 122, a device management server 124, one or more Low Earth Orbit satellites 130, 132, one or more Medium Earth Orbit (MEO) satellites 140, 142, and/or one or more Geosynchronous Equatorial Orbit (geostationary or GEO) satellites 150, 152.

A multipath modem 110 includes at least one satellite radio (i.e., satellite transceiver) and at least one terrestrial wireless radio (wireless transceiver), which may be integrated, partially integrated, or separate from each other. The multipath modem 110 may be integrated into a multipath communication device, also referred to as a multipath device, or may be a separate device connected to a terminal (e.g., a network router, computer, set-top box, television, etc.) to act as a communication device.

The multipath modem 110, i.e., a modem that can communicate via both satellite and terrestrial networks, may use the terrestrial wireless (i.e., cellular) radio to communicate with one or more compatible terrestrial wireless networks. Thus, the multipath modem 110 may communicate, for example, with a first terrestrial wireless network 120 operated by a first wireless network operator and/or a second terrestrial wireless network 122 operated by a second wireless network operator. Although two terrestrial wireless networks 120, 122 are illustrated, the present disclosure is not limited to a particular number of terrestrial wireless networks or operators, and only one terrestrial wireless network is required for multipath communication. Additional terrestrial wireless networks and operators may also be employed, such as other cellular networks within a single operator's control, or other networks available via a partnership, roaming, or other arrangement.

The multipath modem 110 may use the satellite radio to communicate with a satellite operated by a satellite network operator, and is capable of communication over one or more compatible satellite networks. Thus, the multipath modem 110 may communicate, for example, with a first Low Earth Orbit (LEO) satellite 130 operated by a first LEO network operator and/or a second LEO satellite 132 operated by a second LEO network operator, with a first Medium Earth Orbit (MEO) satellite 140 operated by a first MEO network operator and/or a second MEO satellite 132 operated by a second MEO network operator, or with a first Geosynchronous Equatorial Orbit (GEO) satellite 150 operated by a first GEO network operator and/or a second GEO satellite 152 operated by a second GEO network operator. Although two of each of the types of satellites are illustrated, the present disclosure is not limited to a particular number of satellite networks or operators, and only one satellite network is required for multipath communication. Additional satellite networks and operators may also be employed, such as within a single operator's control, a partnership, and/or via roaming, or other contractual arrangement.

The multipath modem 110 also communicates with the device management server 124 that assists in the selection of multipath networks and frequencies to be used by the radios of the multipath modem 110, as more fully described below. The multipath modem 110 and device management server 124 may be connected over an anchor network that is predefined in, i.e., stored in a memory of multipath modem 110, such as by a Subscriber Identification Module (SIM) bootstrap operating profile, i.e., an initial eSIM operating profile pre-installed on a SIM (and including parameters such as described below) that loads into memory upon device boot-up to allow initial (or fallback) network access, in a device configuration file of the multipath modem 110. As illustrated in the example of FIG. 1, the anchor network may be, for example, terrestrial wireless network 122, but any suitable network, wired or wireless, may be used without departing from the scope of the present disclosure.

The device management server 124 may evaluate multiple factors in order to determine an optimal selection of the multipath networks and frequencies to be used by the radios of the multipath modem 110. One consideration is selection of a physical transport type (i.e., a transmission medium such as terrestrial cellular radio, LEO satellite radio, MEO satellite radio, GEO satellite radio) and the frequencies to be used. The frequencies that could be used can be determined based on the various frequencies assigned to and used by the various network operators of the identifiable networks available to the multipath modem 110 and the observed signal characteristics for each of the frequencies. For example, a particular 5G cellular network operating in the 3.3 to 3.6 GHz bands of the cellular transport may interfere with a particular MEO satellite network receiving space-to-Earth signals in the 3.4 to 4.2 GHz of the C-band of the satellite transport, so a specific set of non-interfering frequencies may be selected or an alternate satellite transport (e.g., GEO satellite) using a non-interfering frequency (e.g., in the 26-40 GHz Ka-band) may be paired with a first transport (e.g., the 5G cellular network operating in the 3.3 to 3.6 GHz band) to avoid interference from the radio frequencies. Another consideration is the selection of a network operator when multiple networks are available for each transport, which may be based on network planning or policies as well as subscriber plans and data usage. For example, if a user's subscribed plan from one network operator uses a network with interfering frequencies, the user's multipath modem 110 may be reconfigured to use a network of another operator/plan with non-interfering frequencies in the user's location.

Indeed, with use of software and embedded subscriber technology to replace physical Subscriber Identification Module (SIM) cards, such as the Soft SIM (wherein SIM functionality is embedded in a secure execution environment of a processor) and eSIM (a programmable SIM card embedded in a device), the device management server 124 may be used to dynamically switch service providers for each radio of the multipath modem 110 without any intervention of the device user or a service provider technician. An optimal service provider as determined by device management server 124 may change due to physical changes in environment (e.g., network infrastructure upgrades) or due to changes in network relationships (e.g., contract service plans, subscriber plan). The multipath modem 110 or device in which is incorporated should be able to adapt to these changes to maintain optimal operation without user input. Optimal operation of the multipath modem 110 is determined at a system level domain by device management server 124 and cannot be resolved locally at the multipath modem 110 due to limited visibility and information about system level concerns like network operations.

Network and frequency selection may be limited based upon considerations such a radiated radio-frequency interference (RFI), such as for device performance reasons. For devices that contain or operate multiple wireless radios, ensuring that these radios do not interfere at both the radiated signal level and the board level is important for device radio performance. Depending on regions and radio design, satellite and cellular radios may overlap in operational frequency and cause interference with one another in a manner that significantly degrades radio performance. A dual transport device, such as multipath modem 110 that uses satellite and cellular radios, can experience radio interference. Thus, a mechanism is needed to negotiate operational frequencies for both the satellite and cellular radios.

A radio of the multipath modem 110 may be able to identify multiple compatible networks to operate on. This is especially true of 3rd Generation Partnership Project (3GPP) based cellular radios since these devices are designed to use industry standards to roam on multiple provider networks and handoff between multiple cells/beams during operation and mobility to provide a better signal and connection. In a cell edge location or a location equidistant from multiple compatible cell towers, cell reselection and handoff occurs more frequently to adapt to its environment. Temporary cell reselections to a lower performing cell can introduce connectivity downtime and alter transport performance. These reselection events introduce service level changes and performance concerns which are undesirable for a user of the communication device with the multipath modem 110.

Figures 2, 3:
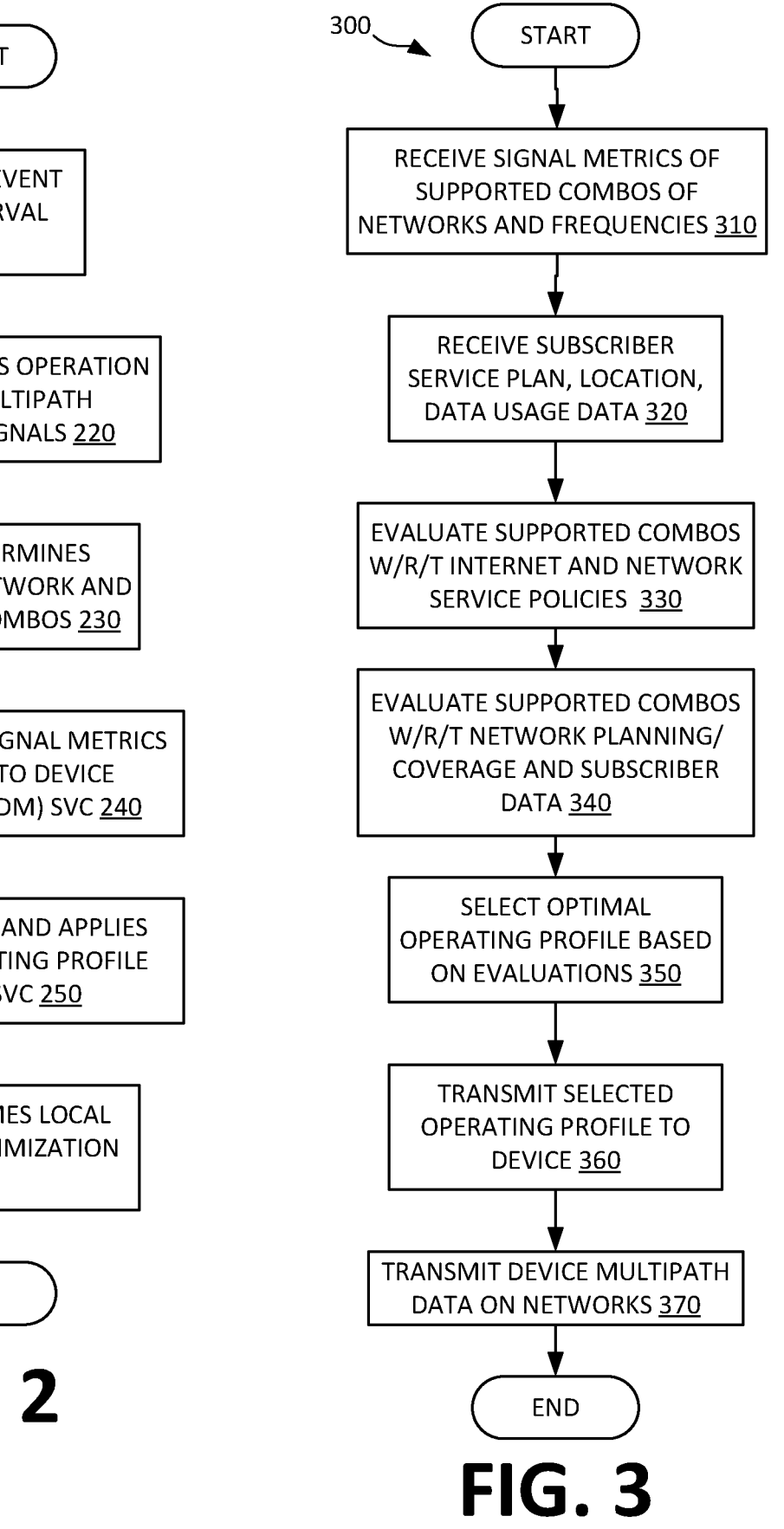
FIG. 2 is an example process flow for a multipath modem.
FIG. 3 is an example process flow for multipath device management.

With reference to FIG. 2, an example process 200 for operation and optimization of a multipath modem 110 is illustrated from the perspective of the multipath modem 110. Process 200 interacts with process 300 performed at the device management server 124 in FIG. 3 to optimize an operating profile for the multipath modem 110 from both a device and a system level.

The process 200 may begin at a first block 210, wherein at trigger events and/or required intervals, a processor in the multipath modem 110 may initiate a network configuration to optimize of the multipath modem 110 by optimizing the operating profile of the multipath modem 110. A trigger event is an event that can be determined from received or detected data and that can then be used as a basis to initiate an action or algorithm. Trigger events may include an initial device startup, a loss of network connection, a periodic interval, or a push operation from the network or device management server 124. Periodic intervals may be hourly, daily, weekly, monthly, etc., and may depend on the particular operating environment of the multipath modem 110. The operating profile includes parameters (i.e., data) governing operation of the radios of the multipath modem 110, including at least one or more combinations of an operating network and frequency or frequencies for each of the satellite radio and the cellular radio (e.g., Radio A: Network1/Frequency1, Network 1/Frequency2 . . . Radio B: Network4/Frequency6, Network 4/Frequency7 . . . ).

In an implementation, the operating profile may include a prioritized list of combinations of a satellite network and a cellular network with associated frequencies, wherein each combination may identify a preferred list or set of frequencies for each transport. For example, a multipath combination in an operating profile may include a GEO satellite network having two available frequencies and a cellular network having with three available frequencies (or channels) for each of the uplink and downlink; an operating profile typically includes a plurality of such multipath combinations.

In a next block 220, the multipath modem 110 performs an operational scan wherein the radios of the multipath modem 110 cycle through the various frequencies within their capabilities to survey the various broadcast channels of the network operators that are supported by the capabilities of the radios in the multipath modem 110 (as is typically provided by a built-in selection algorithm of a modem radio) to identify available compatible satellite networks and terrestrial wireless networks across supported frequencies for each radio, and record observed network signal statistics (i.e., metrics) such as observed signal levels (e.g., RSSI), observed noise levels (e.g., SNR), observed bandwidth/capacity for each network and supported frequency. During an initial operational scan, a network and frequency database (as described later) can be created and initially populated.

In block 230, the multipath modem 110 determines supported networks and frequency combinations. To do this, the multipath modem 110 may evaluate the operational data and compute supported network and frequency combinations by taking into account hardware device and radio support (to determine all possible networks and frequencies the radios can access), and then determining the supported networks and frequency combinations by eliminating interfering or otherwise excluded combinations, such as by considering Inter Radio Access Technology (RAT) compatibility based on known or observed radio frequency/channel interference and device system policies, such as exclusion lists, etc.

In a next block 240, the multipath modem 110 submits the resulting combinations of supported networks and frequencies and their observed metrics, as well as subscriber information (e.g., ID, plan, location), to the device management server 124 (see also the counterpart block 310 in FIG. 3). The combinations of supported networks and frequencies may include a combination of a supported satellite network and satellite frequencies and a supported cellular network and cellular frequencies.

In block 250, the multipath modem 110 receives a selected operating profile from the device management server 124 (see counterpart block 360 in FIG. 3), and applies the selected operating profile to the radios of the multipath modem to perform multipath communication using the multipath modem 110 using the networks and frequencies identified in the selected operating profile. As explained above, the operating profile may include a prioritized or ranked list of selected networks for the satellite and cellular transports and operational frequencies for each network. Applying the selected operating profile may involve updating a configuration for each radio with a frequency for each transport of a multipath combination, typically with those identified in a top-ranked combination. For radio network updates, a new network operator profile may be pushed to the multipath modem 110 and stored, e.g., in a local Subscriber Identification Module (SIM, soft SIM, eSIM, etc.) so that the multipath modem 110 can use the new radio network.

Figures 4, 5:
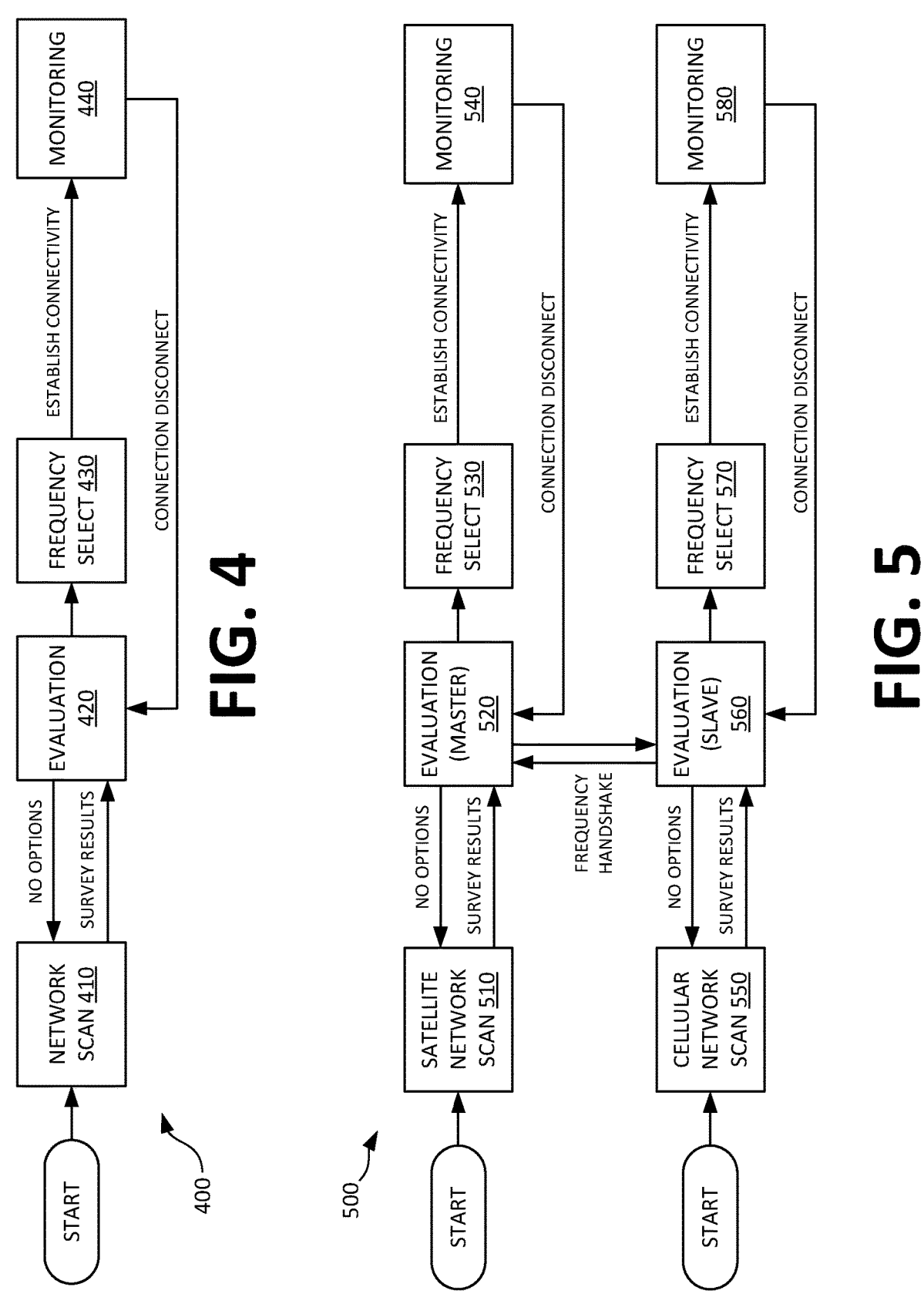
FIG. 4 is an example flow diagram for network frequency optimization.
FIG. 5 is an example flow diagram for coordinating network transport frequencies in a master/slave configuration.

In a block 260, the multipath modem 110 performs or resumes local network optimization, wherein the multipath modem 110 operates to actively track and analyze network conditions for the radios of both transports as configured by the selected operating profile to compute a priority list of operational frequencies for the selected networks, and coordinate the transports' operational frequencies such that the optimal frequency set (uplink/downlink) for both radios can be chosen, as discussed further with respect to FIGS. 4 and 5. The process 200 ends following the block 260.

With reference to FIG. 3, an example process 300 for operating a multipath device management server 124 is illustrated. Process 300 is performed at the device management server 124 and receives data from process 200 performed at the multipath modem 110 (block 240) and supplies a selected operating profile to process 200 (block 250).

The process 300 may begin at a first block 310, where the device management server 124 receives data identifying subscriber and the supported networks and frequency combinations and their observed metrics from a multipath modem 110 (see counterpart block 240 of FIG. 2).

In a next block 320, the device management server 124 receives (or retrieves) subscriber-specific data such as the subscriber plan, the subscriber location, and the subscriber data usage data. The subscriber-specific data may be provided from the multipath modem 110 (e.g., as part of block 240 in FIG. 2) or from a database in communication with the device management server 124 based on a subscriber ID or modem ID, for example.

Further, the device management server 124 may have or otherwise obtain network-specific data, including but not limited to Internet service policies, network service policies, network planning data, network coverage data, and the like. The service policies may include contractual policies and agreements related to partner networks, network roaming, and network rates. In a next block 330, the device management server 124 evaluates the supported networks and frequency combinations from the multipath modem 110 with respect to the Internet service policies and network service policies in order to determine profiles that assist in optimizing network-specific operations (see, e.g., FIG. 8).

For example, the subscriber location may be serviced by four satellite network operators, two of which are network partners, and four cellular network operators, three of which are network partners. Accordingly, the evaluation at block 330 may filter the supported networks and frequency combinations to those of the satellite and cellular network partners in the subscriber's location.

Figure 8:
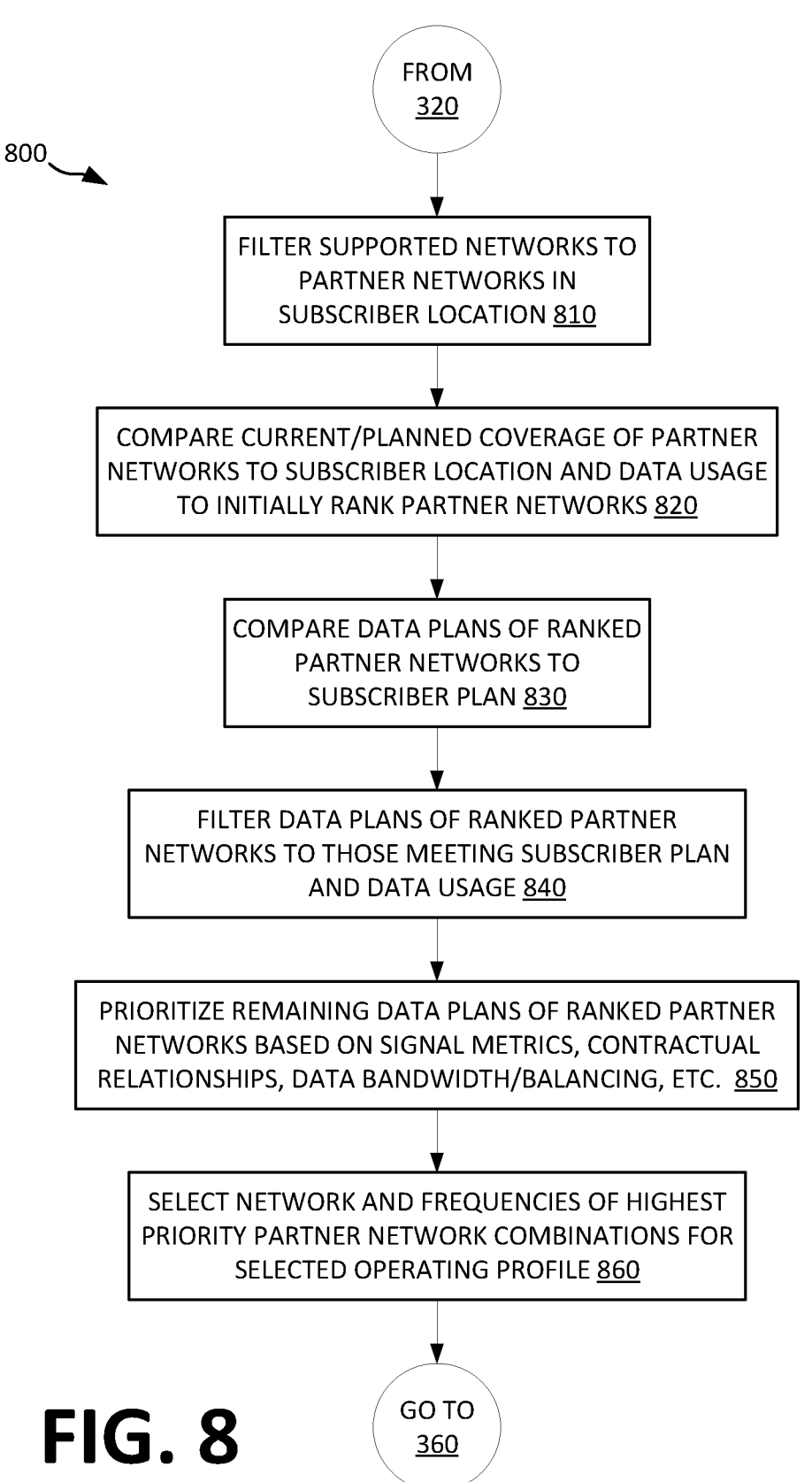
FIG. 8 is an example process flow for evaluating supported networks and frequencies to select an operating profile for a multipath modem.

At a block 340, the device management server 124 may evaluate the supported networks and frequency combinations from the multipath modem 110 with respect to network planning data, network coverage data, and subscriber information to determine networks and frequency combinations to optimize a balance between the subscriber's needs and the network coverage (see, e.g., FIG. 8). The network planning data and network coverage data may include current and forecasted network coverage models, including frequencies, tower/satellite coverage, signal projection, and the like. The subscriber information may include their service plan, location, and current data usage.

For example, the subscriber service plan may include a 500 GB data usage allocation. Of the two partner satellite network operators serving the subscriber's location, a first may offer a per/GB rate and a second may offer a 100 GB plan and a 400 GB plan. Of the three partner cellular network operators, a first may offer a 20 GB individual plan, second may offer a 100 GB individual plan, and a third may offer a 500 TB pooled plan. Accordingly, the evaluation at block 340 may filter the supported networks and frequency combinations to the 400 GB plan of the second partner satellite operator, and to the 100 GB individual plan of the second partner cellular operator and the 500 TB pooled plan of the third partner cellular operator. The evaluation at block 340 may further prioritize the third partner cellular operator over the second cellular network operator based network planning, coverage, and/or contractual issues (see, e.g., FIG. 8).

In a next block 350, the device management server 124 selects multiple sets of optimal configuration parameters (e.g., an optimal operating profile) for the multipath modem 110 based upon the various evaluations of the supported networks and frequency combinations received at block 310 and prioritizes the results based upon the expected network coverage as indicated by the signal metrics (see, e.g., FIG. 8). Thus, the multiple sets of optimal configuration parameters may include various combinations in a prioritized or ranked preference, and may be provided in a selected operating profile.

For example, the selected operating profile may specify a combination of a satellite network of the second partner satellite operator with an operating frequency of 29.1 GHz having a bandwidth of 200 MHz and a signal quality factor (SQF)=120 and a cellular network of the third partner cellular operator with an operating frequency of 630 MHz with a bandwidth of 10 MHz and a reference signal received power (RSRP)=100 as a first ranked combination, and a combination of the satellite network of the second partner satellite operator with the operating frequency of 29.1 GHz and the cellular network of the third partner cellular operator with an operating frequency of 2100 MHz with a bandwidth of 10 MHz and an RSRP=110 as a second ranked combination.

In a block 360, the device management server 124 transmits the selected configuration parameters for the radios of the multipath modem 110, typically via a selected operating profile, to the multipath modem 110 (see counterpart block 250 in FIG. 2).

In a block 370, multipath data is transmitted by the multipath modem 110 over the networks and frequencies identified in the configuration parameters of the selected operating profile. The process 300 ends following the block 370.

With reference to FIG. 4, an example process 400 of performing local network optimization of a radio (i.e., a single transport) in the multipath modem 110 is illustrated in accordance with block 260 of FIG. 2. The process 400 can be carried out according to program instructions stored in the modem 110 and executed in a processor of the modem 110. As described with respect to the process 400, the multipath modem 110 can perform local network optimization and operate to actively track and analyze network conditions for a radio to compute a priority list of frequencies and coordinate the transport's operational frequency such that the optimal frequency set (uplink/downlink) for the radio can be chosen.

In a first block 410, the multipath modem 110 performs a network scan with the radio of a transport of the multipath modem 110. The network scan discovers and records all observable network frequencies for the frequency band specified in the operating profile and their associated metrics at the location of the multipath modem 110. This network scan may not be required since the initial operational scan performed at block 220 for device profile selection may have previously obtained this information, but also may be executed to provide updated information.

In a next block 420, the multipath modem 110 evaluates the results of the network scan performed in the block 410 or 220 relative to the network frequencies specified in the operating profile, and ultimately outputs rankings of uplink/downlink frequencies to be used to connect to a radio to the frequency band identified in the operating profile when the operating profile identifies more than one uplink/downlink frequency for a transport. The multipath modem 110 maintains a persistent historical database (initially populated as described above concerning block 220 of FIG. 2) of identified/observed frequencies, and their associated metrics such as signal quality and network connectivity information. The evaluation also takes recent data such as current observed signal levels into account to address current conditions such as weather-related degradation to certain frequency bands. The evaluation may further include, for example, computing a composite score that uses historical database and network survey results to generate a list of preferred frequencies of those identified in the selected operating profile for the radio uplinks/downlinks based on an internal ranking mechanism. The composite scoring may take alternate transport frequency results into account such that frequencies selected do not introduce an interference event.

For example, computing a composite score may include adding up a weighted average of core key performance indicators (KPIs) such as signal strength, signal-to-noise ratio, bandwidth, estimated throughput, estimated packet loss, etc., with the score reduced by any penalties based on recent inconsistent performance, e.g., $W_1kpi_1+W_2kpi_2+W_3kpi_3+W_4kpi_4-$penalties=composite score. In another implementation, the KPIs for each frequency may be harvested and applied to a machine learning (ML) program to generate the scoring which may be used to rank the frequencies and generate the list of preferred frequencies.

In a block 430, the multipath modem 110 is configured to operate according to one of the preferred frequencies from the list and a connection to a network is established. Typically, both an uplink and a downlink connection with be established, and the highest ranked frequencies will be selected, and if a disconnection occurs, the next highest ranked frequencies will be selected. However, in another implementation, a survey of each of the preferred frequencies may be performed during downtime or off-peak usage to permit scoring of the entire list of preferred frequencies.

In a next block 440, the multipath modem 110 monitors the network connection to periodically update the historical database on relevant statistical metrics like signal metrics, network performance, connection uptime/success rate, etc., while the connection is active. If the multipath modem 110 disconnects the network connection due to network issues or purposely for survey reasons during an off-peak time, the process moves to block 420 and the multipath modem evaluates (scores) the network connection before moving on to a next preferred frequency in the list. Upon completion of the evaluations of the preferred frequencies at block 420, the multipath modem 110 operates on the frequency with the highest performance or score as determined by the evaluations.

The local network optimization by the multipath modem 110 can also include network tracking over time. Upon an initial startup, a multipath modem 110 may initiate a network scan. The scan detects all available compatible networks and their initial observed signal metrics, which serve as the initial basis for network analysis. Over time, changes in signal metrics for various networks can be tracked.

If a network scan is not possible or a network preference is unknown (i.e., prior to receiving a selected operating profile), a training mode may be used. The training mode allows all frequencies except those colliding/interfering with an alternate transport for operation. Over time, the cellular radio of the multipath modem 110 will handoff between cells or settle on a singular preferred cell. The training period is configurable and once a training period transpires, evaluation and frequency filtering begins. For example, a default period of 30 minutes may be used since this is a typical duration of a service install.

In a situation is which a network scan is incomplete or the multipath modem 110 has been moved, the network tracking can be reset. Such a reset will clear the historical data and database and restart the local network optimization process with a new network scan.

The local network optimization may also include tracking various statistics and/or metrics over time to ascertain trends, including the tracking of connectivity availability and throughput over a most recent 24 hour period to be used to determine penalties in the composite scoring. These statistics and metrics may include signal metrics, including signal strength (RSSI) or equivalent to indicate a received signal strength from network cell or satellite beam, and a Signal to Noise Ratio (SNR) or equivalent to indicate a ratio of signal power to noise power, accounting for interference and/or noise. The statistics may also include network performance statistics indicating network performance and/or reliability, which may include, for example, uplink/downlink throughput (wherein despite a good signal, there could be low throughput), connection uptime, and connection success rate (e.g., connection success per attempts).

In one implementation, the local network optimization may include composite scoring, as discussed above with respect to block 420. In an implementation, composite scoring may include evaluating each observable cell or satellite beam and assigning a weighted score. An initial weighted score may be based on signal metrics from a most recent period, for example the last 30 seconds that have been observed. Based on key performance indicator (KPI) objectives of the radio signals for a frequency, weighting can be determined. For example, in an implementation, an additional 25% may be applied to SNR to ensure lower noise frequencies are selected. For an initial evaluation, a normal distribution of scores may be assumed and cells may be selected whose scores are within one standard deviation of the max score. Further investigation and optimization can be performed, such as through machine learning based upon collection of the KPIs for each frequency. Scoring may also take into account the alternate transport operational frequency (by including scores for both transports) and take into account the preferred network priority (such as by including a multiplier, such as 1.5×, for a preferred network).

In one example scoring implementation, a 50% weight may be given to signal strength (e.g., RSSI), a 30% weight may be given to signal quality (e.g., SNR), and a 20% weight may be given to bandwidth. Each metric is also normalized or tuned to bound the value range, such as between 1-100. A first network/frequency option may have a normalized signal strength of 80 (out of 100), a normalized signal quality of 80, and a normalized bandwidth of 50. This first option would have a score of (50%*80)+(30%*80)+(20%*50)=74. A second network/frequency option may have a normalized signal strength of 60, a normalized signal quality of 60, and a normalized bandwidth of 50. This second option would have a score of (50%*60)+(30%*60)+(20%*50)=58. Thus, the first option would have a higher rank based upon its higher score.

After weighted scoring, penalties may be utilized to adjust the scoring by up to a predetermined number of points, such as 20 points. For example, penalties may us used to: (i) deprioritize high scoring cells that are exhibiting temporary poor connectivity or low throughput; (ii) adjust for temporary network outages, increased load, etc.; and (iii) adjust for recent (i.e., last 24 hours) connectivity availability percentage. Based on target KPI thresholds, connection and throughput metrics may be used to determine whether to increase a penalty. For example, if connection uptime must be 98% or better over the past 24 hour period, then if the uptime is below 98% during the evaluation, a 1 point penalty may be applied, if uptime is below 95%, a 3 point penalty may be applied, and if below 90%, a 5 point penalty may be applied. Penalty points may be applied for network connection uptime, network connections attempts over a 24 hour period exceeding a threshold, average network package loss over a 24 hour period exceeding a threshold, and/or throughput over a 24 hour period being below a target threshold for a given transport. The penalty weight may grow with a delayed exponential function and allow for short and rare connection drops or momentary dips in throughput. In an example, a penalty may be reduced (e.g., by 1 point) if upon the next evaluation, the metrics are above the KPI thresholds.

As illustrated in FIG. 5, the multipath modem 110 may include programming to provide a satellite transport optimizer and a cellular transport optimizer, which may be used per process 500 to coordinate transport frequencies when performing local network optimization (see block 260 of FIG. 2). In an implementation, the multipath modem 110 may monitor and optimize the networks and frequencies of both transports (satellite and cellular). The multipath modem 110 performs local network optimization and thereby operates to actively track and analyze network conditions of the radios of both transports to compute a priority list of frequencies for each transport based on the networks and frequencies from the operating profile, and to coordinate the transports' operational frequencies such that the optimal frequency set (uplink/downlink) for both the radios can be chosen.

In a first block 510, the satellite transport optimizer performs a network scan. The satellite network scan discovers and records all observable network frequencies for the satellite network selected in accordance with the operating profile and their associated metrics at the location of the multipath modem 110.

In a next block 520, the satellite transport optimizer evaluates the results of the satellite network scan in block 510, such as adding the observed signal metrics to the database and scoring or ranking the frequencies so as to ultimately rank the preferred frequencies. The multipath modem 110 maintains a persistent historical database of observed frequencies (initially populated at block 220 of FIG. 2), and their associated metrics such as signal quality and network connectivity data. The evaluation may further include, for example, calculating a composite score based on weighted average signal metrics that uses historical database and network survey results as discussed with respect to FIG. 4 to calculate a list of preferred frequencies for the satellite radio based on an internal ranking mechanism.

In a block 530, a frequency is selected for configuring the multipath modem 110 with one of the preferred frequencies from the list, and a satellite connection is established.

In a next block 540, the satellite transport optimizer monitors the satellite connection to periodically update the historical database on various statistical metrics like signal metrics, network performance, connection uptime/success rate, etc. The satellite connection may then be disconnected and evaluated before moving on to a next preferred frequency in the list. The various options from the operating profile may be reviewed each time a transport event such as a disconnection or significant reduction is performance occurs. Additionally, a task may be executed during off-peak hours to cycle through the various options for evaluation purposes.

In a block 550, the cellular transport optimizer performs a cellular network scan. The cellular network scan discovers and records observable network frequencies for the cellular network selected in accordance with the operating profile and their associated metrics at the location of the multipath modem 110.

In a next block 560, the cellular transport optimizer evaluates the survey results of the cellular network scan in block 550 to determine preferred alternate frequencies. This cellular network evaluation maintains a persistent historical database of observed frequencies, and their associated metrics such as signal quality and network connectivity information. The evaluation may further include, for example, a composite score that uses historical database and network survey results to calculate a list of preferred alternate frequencies for the cellular radio based on an internal ranking mechanism.

In a block 570, a frequency is selected for configuring the multipath modem 110 with one of the preferred alternate frequencies from the list, and a connection is established.

In a next block 580, the cellular transport optimizer monitors the cellular network connection to periodically update the historical database on key statistical metrics like signal metrics, network performance, connection uptime/success rate, etc. while the connection is active. If the connection is disconnected due to network issues or purposely for survey reasons during an off-peak time, the process moves to block 560 and the multipath modem evaluates (scores) the connection before moving on to a next preferred alternate frequency in the list.

As illustrated, one optimizer can be assigned as the master (satellite in this case) and the alternate as slave (cellular in this case). As described below with respect to FIGS. 6 and 7, a frequency handshake between the optimizers may coordinate a master frequency priority list with an alternate transport's frequency priority list. In this manner, a master transport optimizer (for example, a satellite in this case and in FIG. 6) may determine conflicting frequency ranges and convey disallowed frequencies to the slave transport optimizer. Upon completion of the evaluations of the preferred frequencies at blocks 520 and 560, the multipath modem 110 can store or will have stored a set of candidate operating profiles.

Figure 6:
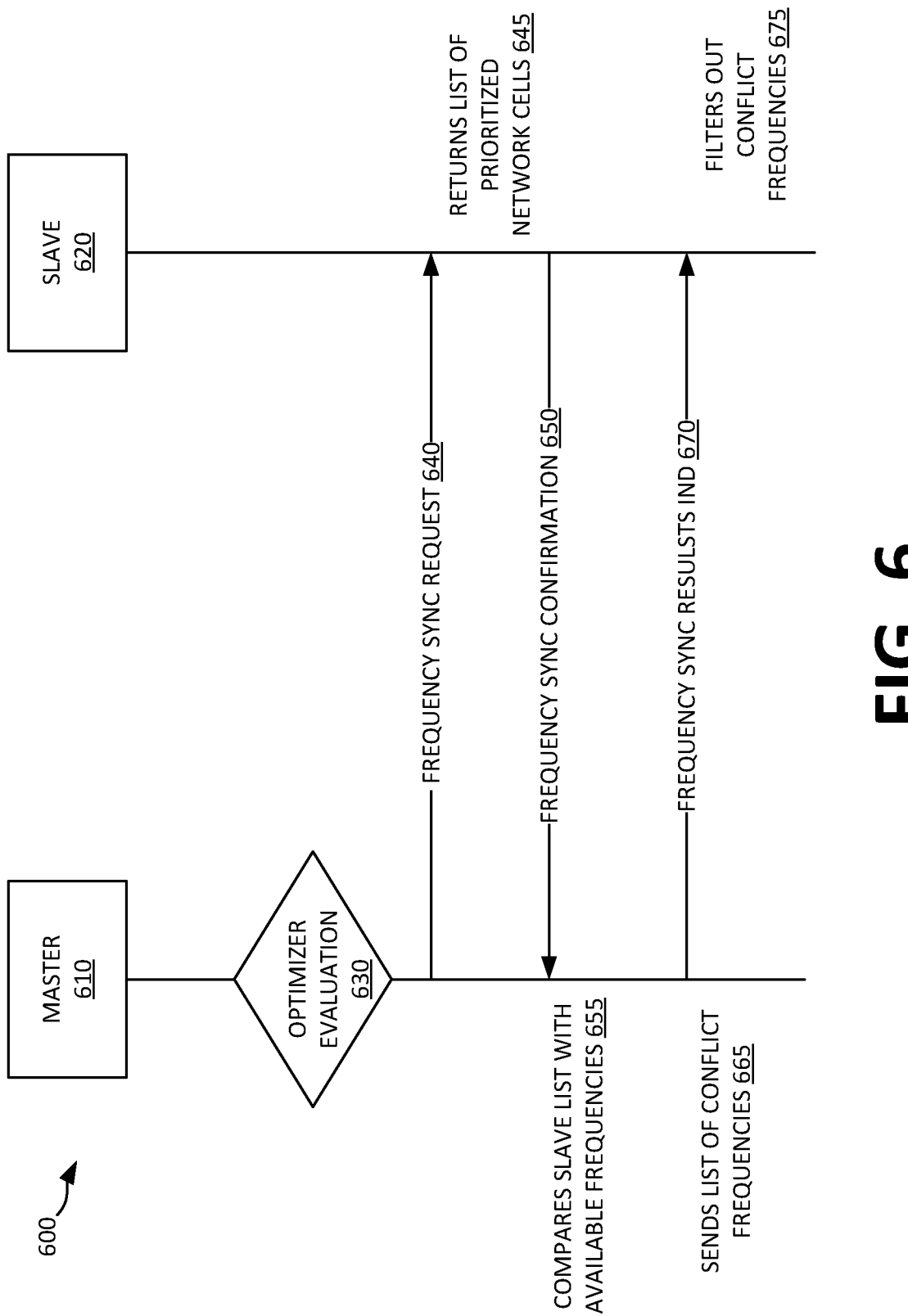
FIG. 6 is an example data flow diagram with a master optimizer evaluation.

With reference to FIG. 6, an example diagram 600 illustrates a data flow for a master-initiated sync of coordinating transport frequencies.

An optimizer evaluation 630 is performed at master 610 by a master transport optimizer (see FIG. 5, block 520). As part of a frequency handshake, the master 610 initiates a frequency sync by sending a frequency sync request 640 to slave 620. Slave 620 returns a list of prioritized network cells 645 in a frequency sync confirmation 650. The master 610 compares the slave's list of prioritized frequencies with master's prioritized frequencies (i.e., available frequencies) 655. The master 610 then sends a list of conflict frequencies 665 to slave 620 in a frequency sync results indication 670. The master 610 may select frequency pairings that have high priority for both transports. If slave 620 has limited options, then master 610 may select different frequencies. Slave 620 then filters out conflict frequencies 675. If slave 620 is operating on a conflict frequency, it disconnects and re-evaluates with a non-conflicting frequency.

Figure 7:
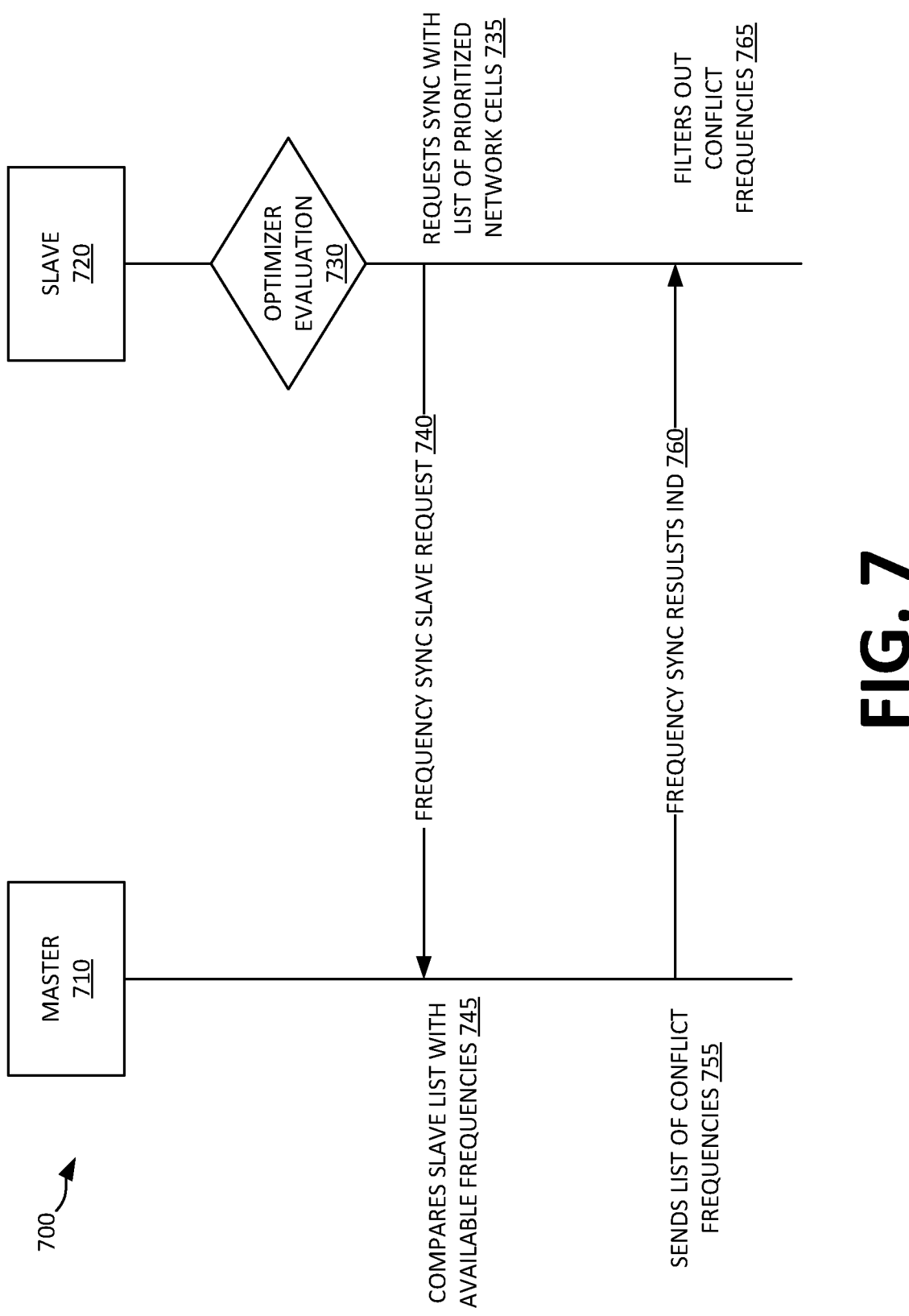
FIG. 7 is an example data flow diagram with a slave optimizer evaluation.

With reference to FIG. 7, an example data flow diagram 700 is illustrated for a slave-initiated sync of coordinating transport frequencies.

An optimizer evaluation 730 is performed at slave 720 by a slave transport optimizer See FIG. 5, block 560). As part of the frequency handshake, the slave 720 initiates a frequency sync by requesting sync with a list of prioritized network cells 735 by sending a frequency sync slave request 740 to master 710. Master 710 compares the slave list with available frequencies 745 and returns a list of conflict frequencies 755 in a frequency sync results indication 760. The master 710 may select frequency pairings that have high priority for both transports. Slave 720 then filters out conflict frequencies 765. If slave 720 is operating on a conflict frequency, it disconnects and re-evaluates with a non-conflicting frequency.

With reference to FIG. 8, an example process 800 of the evaluations performed at the device management server 124, such as in blocks 330 and 340 of FIG. 3, is illustrated. Process 800 is only an example of the various possibilities in which the device management server 124 may perform evaluations to account for system level considerations in the selection of an operating profile for the multipath modem 110.

Example process 800 begins after block 320 of FIG. 3, wherein the device management server 124 has already received the signal metrics of supported networks and frequencies (block 310) and subscriber information regarding location, service plan, and data usage (block 320).

At a block 810, the device management server 124 may filter the supported networks from the multipath modem 110 to only ones that are partner networks from partner network operators, wherein partner network operators may include a network operator providing the device management server 124. Partner network operators may have corporate, contractual, or other relationships with each other so as to be designated or otherwise determined as a partner network provider.

As in the example discussed with respect to FIG. 3, the subscriber location may be serviced by four satellite network operators, two of which are network partners, and four cellular network operators, three of which are network partners. Accordingly, block 810 may filter the supported networks and frequency combinations to those of the satellite and cellular network partners in the subscriber's location.

In a next block 820, the device management server 124 may compare current network coverage/bandwidth or planned network coverage/bandwidth of the various partner networks to the subscriber's location and data usage to provide an initial rank of the partner networks. This may provide an initial rank of the various partner networks that is based primarily on the subscriber needs.

In a block 830, the device management server 124 may compare the data plans of the ranked partner networks to the subscriber's data plan. As with the example discussed in FIG. 3, the subscriber service plan may include a 500 GB data usage allocation. Of the two partner satellite network operators serving the subscriber's location, a first may offer a per/GB rate and a second may offer a 100 GB plan and a 400 GB plan. Of the three partner cellular network operators, a first may offer a 20 GB individual plan, second may offer a 100 GB individual plan, and a third may offer a 500 TB pooled plan.

In a next block 840, the device management server 124 may filter the data plans of the ranked partner networks to those that meet the subscriber's data plan. Accordingly, as with the example in FIG. 3, the device management server 124 may filter the supported networks and frequency combinations to the 400 GB plan of the second partner satellite operator, and to the 100 GB individual plan of the second partner cellular operator and the 500 TB pooled plan of the third partner cellular operator.

In a block 850, the device management server 124 may prioritize the remaining data plans of the ranked partner networks based on various criteria, including but not limited to signal metrics, corporate or contractual relationships, network bandwidth and/or load balancing considerations, etc. As in the example discussed in FIG. 3, the device management server 124 may prioritize the third partner cellular operator over the second cellular network based upon one or more of the considerations discussed above.

In a block 860, the device management server 124 may select the networks and frequencies of the highest priority partner network combinations for use in the selected operating profile for the multipath modem 110. As in the example discussed in FIG. 3, the device management server 124 may select an operating profile specifying a combination of a satellite network of the second partner satellite operator with an operating frequency of 29.1 GHz having a bandwidth of 200 MHz and a signal quality factor (SQF)=120 and a cellular network of the third partner cellular operator with an operating frequency of 630 MHz with a bandwidth of 10 MHz and a reference signal received power (RSRP)=100 as a first ranked combination, and a combination of the satellite network of the second partner satellite operator with the operating frequency of 29.1 GHz and the cellular network of the third partner cellular operator with an operating frequency of 2100 MHz with a bandwidth of 10 MHz and an RSRP=110 as a second ranked combination.

The evaluation and selection process 800 ends by moving to block 360 of FIG. 3.

Computers or processors in device management server 124, multipath modem 110, or multipath communication devices attached to multipath modem 110, include respective processors and memories. A computer memory can include one or more forms of computer readable media, and stores instructions executable by a processor for performing various operations, including as disclosed herein. For example, the computer can be a generic computer with a processor and memory as described above and/or a controller, or the like for a specific function or set of functions, and/or a dedicated electronic circuit including an ASIC that is manufactured for a particular operation, e.g., an ASIC for processing radio data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

As used herein, a computer memory can be of any suitable type, e.g., EEPROM, EPROM, ROM, Flash, hard disk drives, solid state drives, servers, or any volatile or non-volatile media. The memory can store data. The memory can be a separate device from the computer, and the computer can retrieve information stored in the memory. Alternatively, or additionally, the memory can be part of the computer, i.e., as a memory of the computer or firmware of a programmable chip.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising a computer including a processor and a memory, the memory storing instructions executable by the processor to:

receive signal metrics data from a multipath modem specifying supported combinations of satellite networks and associated satellite frequencies, and cellular networks and associated cellular frequencies for operation of the multipath modem, each supported combination being a pairing of one of the satellite networks or cellular networks with one of the associated satellite frequencies or associated cellular frequencies, at least one of the satellite networks or cellular networks being in supported combinations with more than one associated satellite frequency or associated cellular frequency;

receive subscriber data including a device location, a subscriber service plan, and subscriber usage data;

evaluate the supported combinations by filtering supported satellite networks and supported cellular networks based upon at least one of internet service policies or network service policies in the device location;

further evaluate the supported combinations based upon ranking the supported combinations based upon at least one of network coverage area or available network bandwidth;

further evaluate the supported combinations based upon comparing data plans of the ranked supported combinations to the subscriber service plan;

further evaluate the supported combinations by filtering the ranked supported combinations to those meeting the subscriber service plan and subscriber data usage to obtain remaining supported combinations;

prioritize the remaining supported combinations based upon at least one of a signal metric, contractual relationship, network data bandwidth, and network data balancing;

select configuration parameters having a selected combination of a satellite network and satellite frequency and a selected cellular network and cellular frequency based on the evaluated supported combinations, wherein the selected configuration parameters are based upon the remaining supported combinations having a highest priority; and transmit the selected configuration parameters to the multipath modem to control operation of the multipath modem.

2. The system of claim 1, wherein the supported combinations include non-interfering network and frequency combinations as determined by an operational scan by the multipath modem, and the selected configuration parameters are included in a selected operating profile.

3. The system of claim 1, further comprising the multipath modem, wherein the multipath modem includes a modem processor and modem memory, the modem memory storing instructions executable by the modem processor to perform an operational scan of satellite and terrestrial wireless network combinations to determine signal strength and signal-to-noise for supported network and frequency combinations.

4. The system of claim 3, further comprising instructions executable by the modem processor to determine non-interfering satellite and wireless network and frequency combinations as the supported combinations.

5. The system of claim 4, further comprising instructions executable by the modem processor to:

receive a selected operating profile with the configuration parameters from the computer; and apply the selected operating profile to the operation of radios of the multipath modem.

6. A method, comprising:

receiving signal metrics data from a multipath modem specifying supported combinations of satellite networks and associated satellite frequencies, and cellular networks and associated cellular frequencies for operation of the multipath modem, each supported combination being a pairing of one of the satellite networks or cellular networks with one of the associated satellite frequencies or associated cellular frequencies, at least one of the satellite networks or cellular networks being in supported combinations with more than one associated satellite frequency or associated cellular frequency;

receiving subscriber data including a device location;

evaluating the supported combinations by filtering supported satellite networks and supported cellular networks based upon at least one of internet service policies or network service policies in the device location;

selecting configuration parameters having a selected satellite network and satellite frequency and a selected cellular network and cellular frequency based on the evaluated supported combinations; and transmitting the selected configuration parameters to the multipath modem to control operation of the multipath modem; and by the multipath modem:

performing an operational scan of satellite and terrestrial wireless network combinations to determine signal strength and signal-to-noise for supported network and frequency combinations;

determining non-interfering satellite and wireless network and frequency combinations as the supported combinations;

receiving a selected operating profile with the configuration parameters from a device management computer; and operating radios of the multipath modem in accordance with the selected operating profile.

7. The method of claim 6, further comprising:

receiving subscriber data including a subscriber service plan and subscriber usage data; and further evaluating the supported combinations based upon ranking the supported combinations based upon at least one of network coverage area or available network bandwidth.

8. The method of claim 7, further comprising further evaluating the supported combinations based upon comparing data plans of the ranked supported combinations to the subscriber service plan.

9. The method of claim 8, further comprising further evaluating the supported combinations by filtering the ranked supported combinations to those meeting the subscriber service plan and subscriber data usage to obtain remaining supported combinations.

10. The method of claim 9, further comprising prioritizing remaining supported combinations based upon at least one of a signal metric, contractual relationship, network data bandwidth, and network data balancing.

11. The method of claim 10, wherein the selected configuration parameters are based upon the remaining supported combinations having a highest priority.

12. The method of claim 6, wherein the supported combinations include the non-interfering network and frequency combinations as determined by the operational scan by the multipath modem, and the selected configuration parameters are included in the selected operating profile.

13. A system comprising:

a computer including a processor and a memory, the memory storing instructions executable by the processor to:

receive signal metrics data from a multipath modem specifying supported combinations of satellite networks and associated satellite frequencies, and cellular networks and associated cellular frequencies for operation of the multipath modem, each supported combination being a pairing of one of the satellite networks or cellular networks with one of the associated satellite frequencies or associated cellular frequencies, at least one of the satellite networks or cellular networks being in supported combinations with more than one associated satellite frequency or associated cellular frequency;

receive subscriber data including a device location;

evaluate the supported combinations by filtering supported satellite networks and supported cellular networks based upon at least one of internet service policies or network service policies in the device location;

select configuration parameters having a selected combination of a satellite network and satellite frequency and a selected cellular network and cellular frequency based on the evaluated supported combinations; and transmit the selected configuration parameters to the multipath modem to control operation of the multipath modem; and the multipath modem, wherein the multipath modem includes a modem processor and modem memory, the modem memory storing instructions executable by the modem processor to:

perform an operational scan of satellite and terrestrial wireless network combinations to determine signal strength and signal-to-noise for supported network and frequency combinations;

determine non-interfering satellite and wireless network and frequency combinations as the supported combinations;

receive a selected operating profile with the configuration parameters from the computer; and apply the selected operating profile to the operation of radios of the multipath modem.

14. The system of claim 13, further comprising instructions executable by the processor to:

receive subscriber data including a subscriber service plan and subscriber usage data; and further evaluate the supported combinations based upon ranking the supported combinations based upon at least one of network coverage area or available network bandwidth.

15. The system of claim 14, further comprising instructions executable by the processor to further evaluate the supported combinations based upon comparing data plans of the ranked supported combinations to the subscriber service plan.

16. The system of claim 15, further comprising instructions executable by the processor to further evaluate the supported combinations by filtering the ranked supported combinations to those meeting the subscriber service plan and subscriber data usage to obtain remaining supported combinations.

17. The system of claim 16, further comprising instructions executable by the processor to prioritize remaining supported combinations based upon at least one of a signal metric, contractual relationship, network data bandwidth, and network data balancing.

18. The system of claim 17, wherein the selected configuration parameters are based upon the remaining supported combinations having a highest priority.

19. The system of claim 13, wherein the supported combinations include the non-interfering network and frequency combinations as determined by the operational scan by the multipath modem, and the selected configuration parameters are included in the selected operating profile.

* * * * *